May 19, 1970     A. F. HICKMAN     3,512,799
COMPRESSION RUBBER TANDEM WHEEL VEHICLE SPRING SUSPENSION
Original Filed April 28, 1967     4 Sheets-Sheet 1
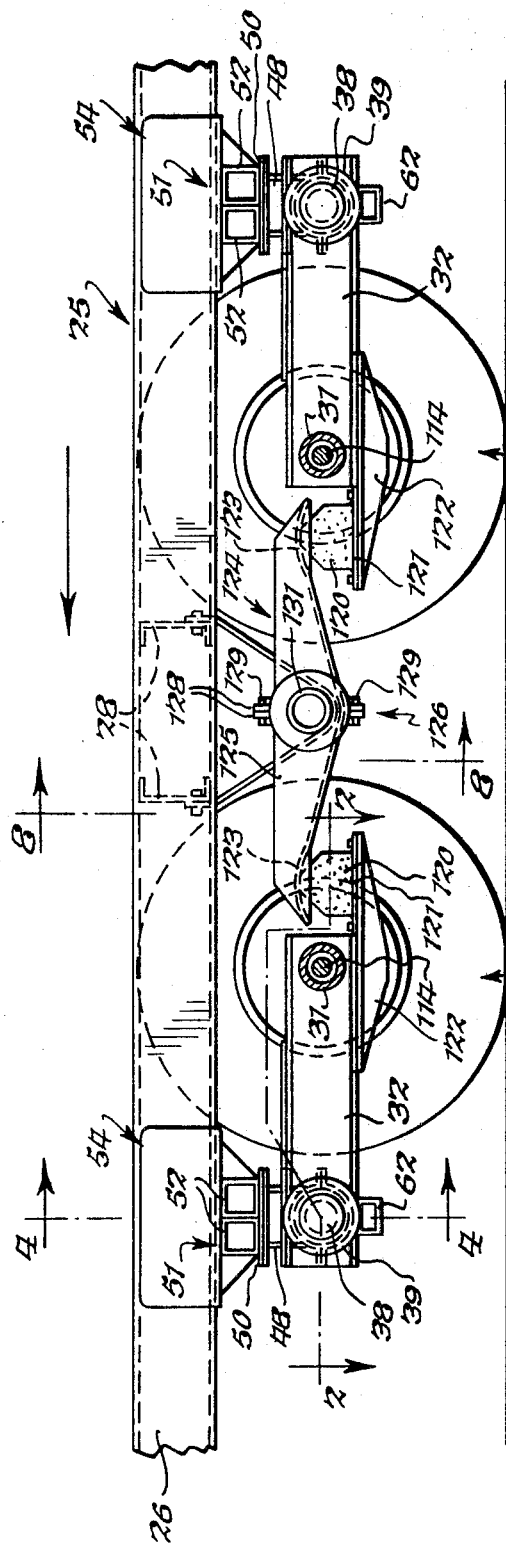
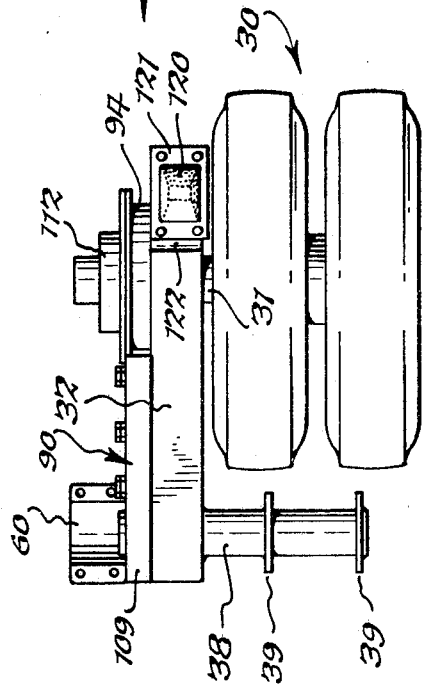
INVENTOR.
Albert F. Hickman
BY
Harold I. Popp
ATTORNEY

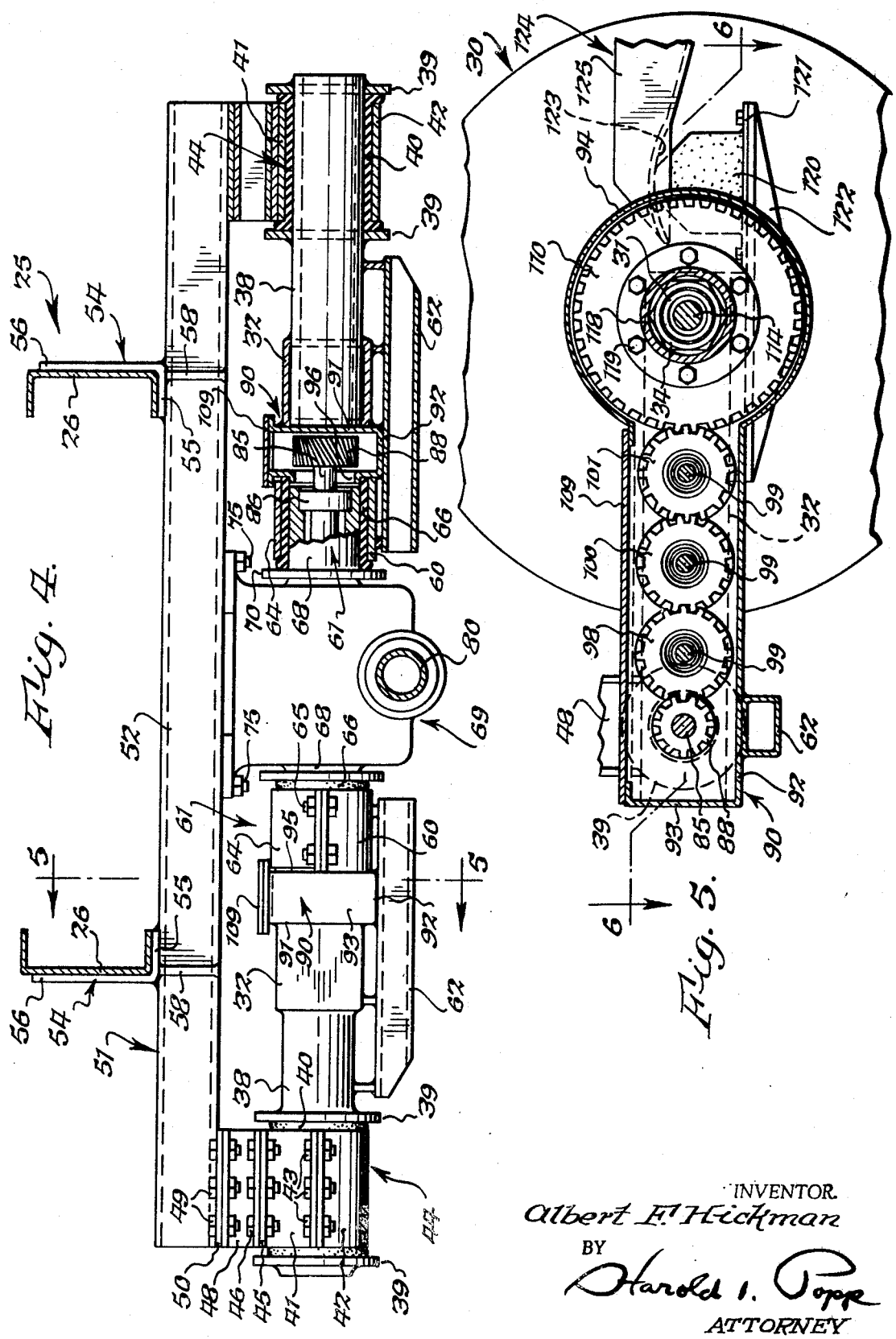

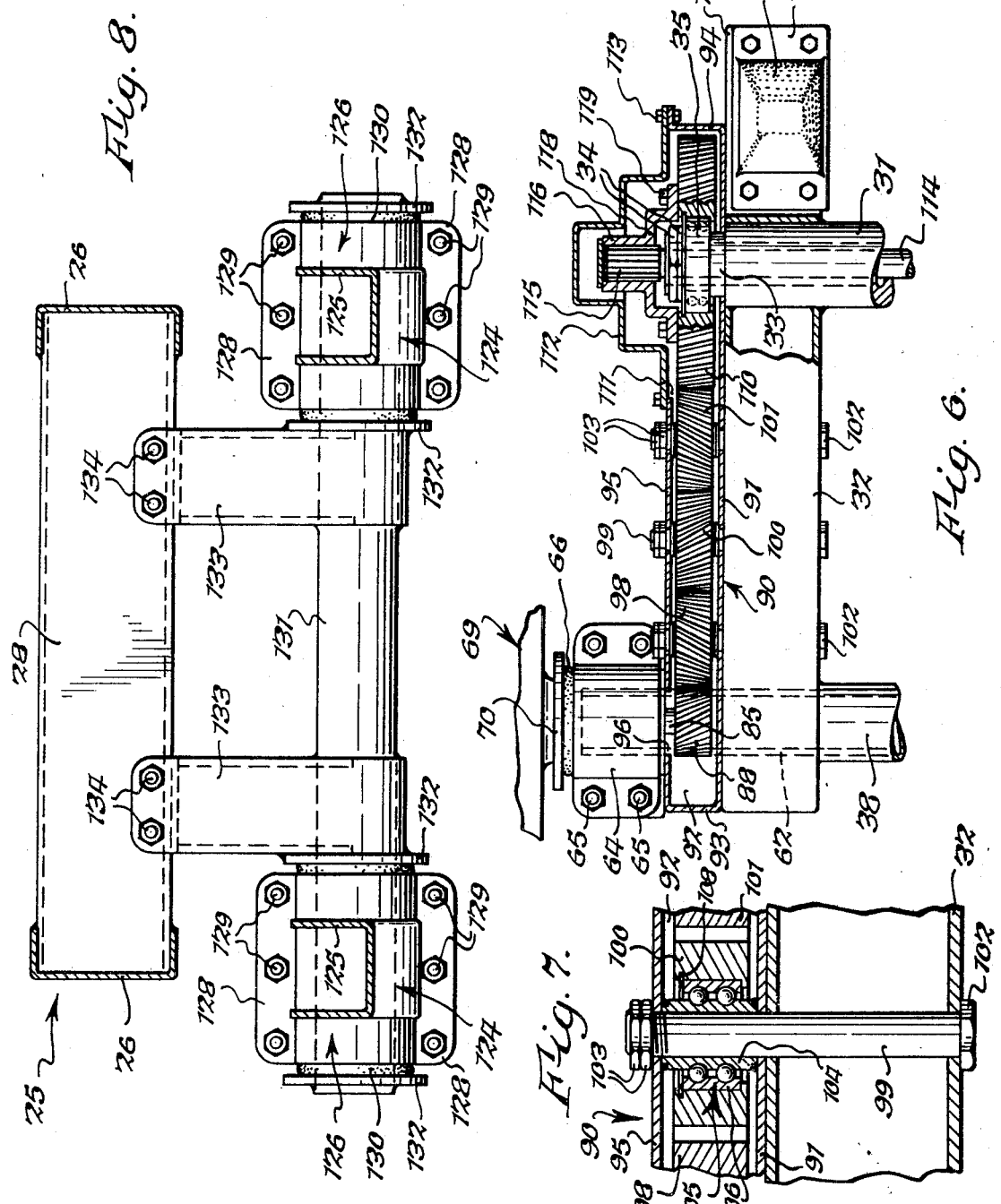

United States Patent Office 3,512,799
Patented May 19, 1970

3,512,799
COMPRESSION RUBBER TANDEM WHEEL
VEHICLE SPRING SUSPENSION
Albert F. Hickman, 8009 N. Gowanda State Road,
Eden, N.Y. 14057
Application Apr. 28, 1967, Ser. No. 634,561, which in
turn is a continuation-in-part of Ser. No. 591,899
filed Nov. 3, 1966. Divided and this application May
29, 1969, Ser. No. 828,874
Int. Cl. B60g 25/00
U.S. Cl. 280—104.5
2 Claims

ABSTRACT OF THE DISCLOSURE

Each of two or more tandem wheels are connected to each side of the vehicle frame by a hub structure journalled to the frame and having a fixed radially projecting arm to the opposite end of which the corresponding wheel is journalled. These arms are in a plane extending lengthwise of vehicle travel and which plane is in common to a walking beam journalled to the frame. Substantially the entire resilient support for the frame is provided by a resilient rubber body between each end of the walking beam and the corresponding one of said arms, these rubber bodies being compressed therebetween to expand and contact laterally of the force of such compression.

---

Figure 3:
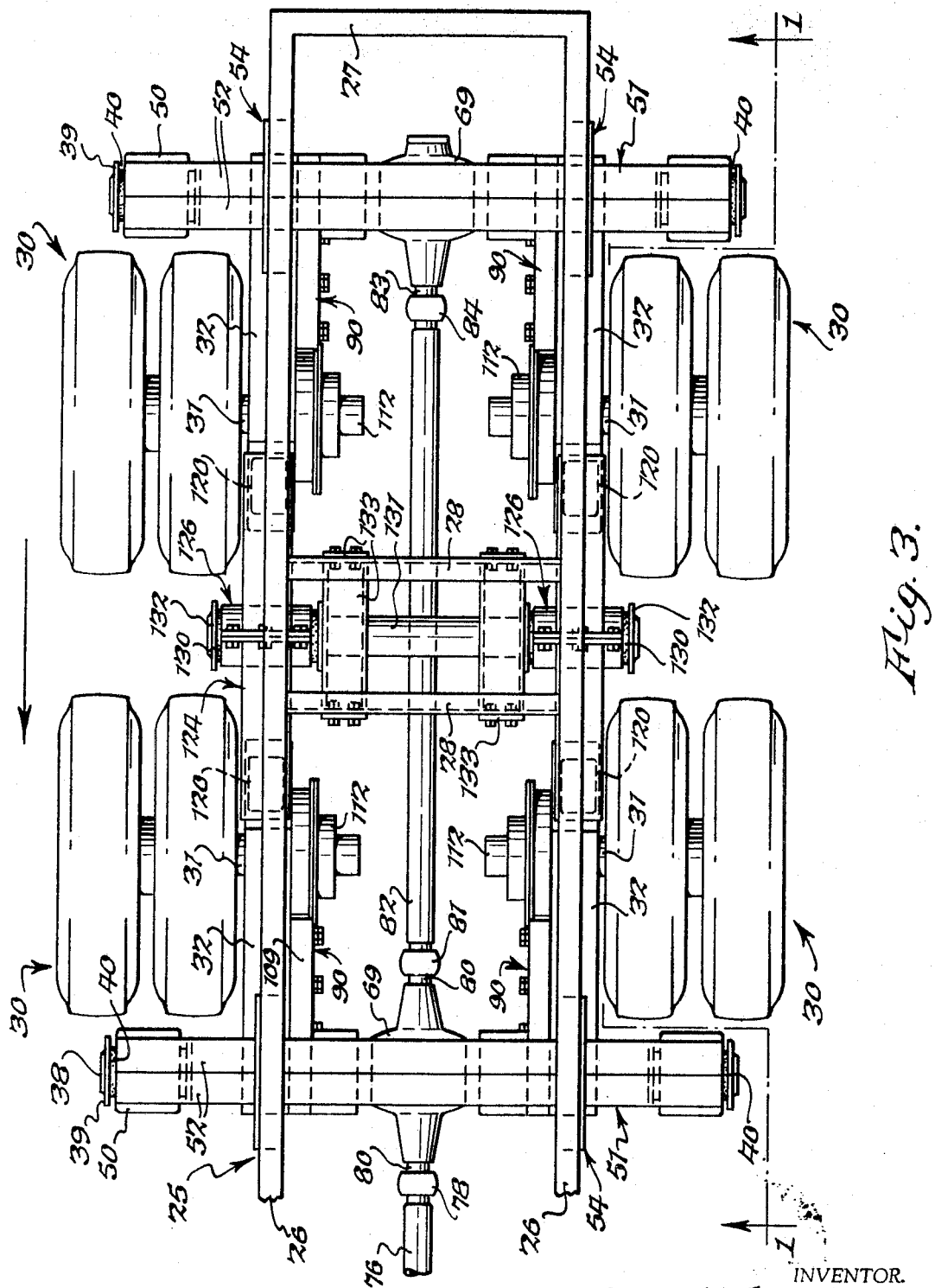

This application is a division of my copending application 634,561, filed Apr. 28, 1967 for Compression Rubber Spring Suspension and which latter is a continuation-in-part of my copending application Ser. No. 591,899, filed Nov. 3, 1966 for Spring Suspension now Pat. 3,410,573, dated Nov. 12, 1968.

In common with my Pat. No. 3,410,573 general objects of the present invention are to provide a vehicle spring suspension which is friction-free but produces resistance to motion in direct proportion to the amplitude and velocity of vertical main frame movement; which consists of compact components which are arranged so as not to interfere with frame and wheel movement and in which the vertically moving parts are arranged inside and close to the wheels and provide high and wide support for the vehicle frame on stub axles with resulting increased stability; which can have softer springs than those now on the market for equivalent duty and at the same time have greater sidesway control through high and wide spring mounting; which can have many years and hundreds of thousands of miles of carefree operation; in which substantially all suspension bearings, other than the wheel bearings, can be in the form of rubber bodies distorted to provide the required movement and are free from friction and lubrication or other service requirements; which is light in weight, particularly in unsprung weight, which is low in both initial cost and upkeep; which renders auxiliary devices for the control of sidesway unnecessary; and in which periodic vibration of the suspension is dampened out.

An important specific object is to provide such a tandem wheel which is adapted for very heavy-duty trucks or other vehicles for highway and off-the-highway services and in which the suspension components do not interfere with the power, control or other components of the truck.

Another specific object is to provide such a tandem wheel suspension made of components which are interchangeable so as to greatly reduce manufacturing cost through mass production of a plurality of identical components and also to reduce inventory requirements in the field for wrecked vehicles.

Another specific object is to provide a tandem wheel suspension in which the resilient support is provided by the compressive action of rubber blocks which in such tandem wheel ssuspension can be arranged to act in series in conjunction with a walking beam so as to contribute jointly to a softer and low frequency ride.

Another specific object to provide such a heavy-duty suspension which is extremely simple and low in cost considering the function it performs.

In the drawings, FIG. 1 is a fragmentary side elevational view of the vehicle frame in the position of carrying a normal load and supported at each side by a tandem wheel suspension embodying the present invention, parts being omitted for the purpose of clarity, this view being taken on line 1—1, FIG. 3, and the wheels being the drive wheels for the vehicle. In this and other views the direction of movement of the vehicle is shown by a large overhead arrow. FIG. 2 is a top plan view of one hub-arm-stub axle unit connecting each wheel with the frame, this view being taken generally on line 2—2, FIG. 1. FIG. 3 is a fragmentary top plan view of the frame and the tandem wheel suspension shown in FIGS. 1 and 2. FIG. 4 is an enlarged vertical transverse section taken generally on line 4—4, FIG. 1. FIG. 5 is a fragmentary longitudinal section taken generally on line 5—5, FIG. 4. FIG. 6 is a fragmentary horizontal section taken generally on line 6—6, FIG. 5. FIG. 7 is an enlarged horizontal section through one of the gears, the section being taken generally on line 7—7, FIG. 5. FIG. 8 is an enlarged vertical transverse section taken generally on line 8—8, FIG. 1.

The vehicle frame 25 can be of any suitable construction and is shown as comprising a pair of main longitudinal side frame bars 26 in the form of inwardly facing channels which are shown as straight and parallel and connected at their rear ends by a cross channel bar 27. The frame is also shown as including intermediate cross channel bars 28, as shown in FIGS. 1, 3 and 8.

The frame 25 is shown as supported by rubber tired wheels 30, these wheels being shown in the form of dual-tired wheels, that is, pairs of rim structures bolted together side-by-side and each pair of rim structures being journalled to a tubular stub azle 31 in any suitable manner (not shown), these stub axles extending horizontally transversely of the line of travel of the vehicle and the stub axles 31 at opposite sides of the vehicle being normally arranged in line with each other as best shown in FIG. 3.

Each tubular stub axle 31 is welded or fixed to the end of an arm 32 which can be of any suitable form but is shown as being of rectangular box form with the stub axle 31 extending through its side walls and being welded to its outboard end, as best shown in FIG. 6. As also shown in this figure, each stub axle 31 has an inner end 33 of reduced diameter in turn having a threaded end protruding toward the center of the frame which carries nuts 34 securing the inner race of a ball bearing 35 on this stub axle extension for a purpose which will presently appear. As best shown in FIG. 1, the arm 32 supported by each forward wheel 30 projects toward the front of the frame 25 from its stub axle 31 so that its inboard end is arranged to the front of the group of wheels 30 whereas the arm 32 supported by each rearward wheel 30 projects rearwardly from its stub axle 31 so that its inboard end is arranged to the rear of the group of wheels 30.

This inboard end of each arm 32 embraces and is welded to an outer tubular hub member 38, this outer hub member extending through the side walls of its box-form arm 32 generally parallel with the axis of its stub axle 31. The inner end of each outer tubular hub member 38 terminates at the inner vertical longitudinal wall of its box-form arm 32 as best shown in FIG. 4, but its outer end projects beyond the side of the vehicle frame so as to be in line with at least a part of the tread of its outer dual wheel 30, as best shown in FIG. 2. This outer end has a pair of spaced rings 39 welded to and projecting radially from its periphery, each pair of these rings serving to prevent the axial displacement of a rubber bushing 40 which compressively embraces each tubular hub member 38 between these rings. Each rubber bushing 40 is embraced by upper and lower half bearing housings 41 and 42 which are drawn together to compress the rubber bushing by bolts 43 extending through the usual side flanges of these half bearing housings. Each rubber bushing 44 and its half bearing housings 41 and 42 form a bearing 44 for the hub 38 of its arm 32. The upper half bearing housing 41 has a welded horizontal top plate 45 connected by bolts 46 to the bottom of a spacer 48 which is in turn connected by bolts 49 to the bottom plate 50 of a frame bolster indicated generally at 51.

Each frame bolster 51 is shown as comprising a pair of horizontal tubes 52 of square form in cross section arranged side-by-side below the side frame bars 26 and with their opposite ends projecting transversely of the line of movement of the vehicle beyond these side frame bars 26 and being connected together by the bottom plates 50. An L-shaped frame bracket 54 has a horizontal flange 55 welded to the top of each end of each pair of tubes 52 and a vertical flange 56 along side and suitably secured to the outer face of the corresponding longitudinal side frame bar 26 as best shown in FIG. 4. Also as shown in this figure and FIG. 1, triangular reinforcing ribs 58 can be provided between the sides of the tubes 52 and the bottom flange 55 of each frame bracket 54.

Each outer tubular hub member 38 is connected to the bottom half 60 of a concentric split bearing housing 61 by a tubular bar 62 welded to both, as well as to the companion arm 32, each bar 62 preferably being of rectangular tubular form in cross section, and suitably welded risers or spacers being provided on top of each bar 62 to compensate for the different distances between the top of the bar and the parts which it connects, as best shown in FIG. 4. Each split bearing housing 61 has an upper half bearing housing 64 connected to the bottom half bearing housing 60 by bolts 65 and the half bearing housings 60, 64 compressively embrace a rubber bearing bushing 66 on a tubular neck or boss 68 projecting horizontally outwardly from the corresponding side of a housing for a differential 69. An axially outwardly projecting ring 70 on this neck or boss limits axial displacement of the rubber bushing 66.

Two housings for differentials 69 are provided as best shown in FIG. 3, one for each pair of wheels 30 on opposite sides of the vehicle. Each of these housings for the differentials is secured, as by stud bolts 75, to the underside of the center of each bolster 51, so that these differential housings are fixed to the vehicle frame 25. The forward differential 69 is driven from the engine (not shown) of the vehicle by a drive shaft 76 through a conventional flexible coupling 78 connecting with the through shaft 80 of this differential, the opposite end of the through shaft 80 being connected through a flexible coupling 81 with a drive shaft 82 for the rear differential 69, the connection to the drive shaft 83 of this rear differential being through a flexible coupling 84. Since the housings for both differentials 69 are bolted via the bolsters 51 to the vehicle frame 25, the only function of the flexible joints 78, 81, 84 is to accommodate frame twisting or other displacement so that these flexible couplings can be of simple and inexpensive construction. Furthermore, it will be noted that the heavy differential housings, together with their contained differential gearing, are a part of the fully sprung load since they are mounted on the vehicle frame 25.

The differential gearing within each housing can be of conventional form and is not shown, this gearing driving a pair of differential output shafts 85 projecting outwardly from the necks or bosses 68 of each differential housing and journalled in bearings 86 therein. Fixed to the outer end of each differential output shaft 85 is a pinion 88 arranged in one end of a gear box indicated generally at 90.

As best shown in FIGS. 6 and 7 one vertical wall 91 of each gear box 90 is fixed to the inner vertical wall of a companion one of the box-form arms 32 and the box is completed by a bottom wall 92, end walls 93 and 94 and a vertical wall 95 which faces the center of the vehicle frame. The bottom wall 92 of the gear box 90 can also be welded to its box-form tube 32, as best shown in FIG. 4, and each vertical wall 95 is provided with an open neck 96 through which the corresponding output differential shaft 85 extends. The rubber bushing 66 also compressively embraces this open neck 96 so as to provide an oil seal between the interior of the arm 32 and the interior of the differential housing neck or boss 68.

The pinion 88 fast to each differential shaft 85 meshes with a gear 98 journalled on a cross bolt 99 this gear meshing with a gear 100 in turn meshing lar cross bolt 99 and this gear 100 in turn meshing with a gear 101 journalled on a similar cross bolt 99, as best shown in FIGS. 5 and 6. As shown in FIG. 7 each of these cross bolts 99 extends completely through the vertical side walls of both the box-form arm 32 and the gear box 90, the head 102 of each bolt 99 bearing against the outer face of the outer vertical side wall of its arm 32 and the nuts 103 of each bolt 99 bearing against the exterior face of the vertical side wall 95 of its gear box 90, these nuts drawing this wall against a cylindrical spacer around the bolt 99 which forms the inner race 104 for a ball bearing 105 the outer race 106 of which is fitted and held within the bore of its gear 98, 100 or 101 in any conventional manner, such as by means of the snap ring 108 as shown in FIG. 7. Upon removing of any of the bolts 99 any of these gears 98, 100, 101 can be removed through the open top of its gear box 90, the gear box being provided with a removable cover plate 109 for this purpose, as best shown in FIGS. 4 and 5.

The end wall 94 of each gear box 90 is in the form of a large cylinder to house a large concentric gear 110 which meshes with and is driven by the gear 101. The wall 95 of gear box 90 is provided with a large circular opening 111 to permit of removal of this gear 110, this opening 111 being covered by a removable cover plate 112 secured to the inner wall 95 by bolts 113 or in any other suitable manner and which is of stepped form as best shown in FIG. 6 to accommodate the full floating drive connection between its gear 110 and the drive shaft 114 for the corresponding wheel 30.

Each of these full floating drive shafts 114 is fixed to its dual wheel 20 in any suitable manner (not shown) and is housed within the tubular stub axle 31 thereof as best shown in FIGS. 1 and 6. The portion of each full floating drive shaft 114 within the stepped cover 112 is formed to provide an enlarged splined portion 115 which is fitted within the internally splined portion 116 of a hub cap 118 which is bolted to the large gear 110 by stud bolts 119 or in any other suitable manner. This gear 110 is carried by the outer race of the ball bearing 35 which, as previously described, is secured to the stub axle extension 33 as best shown in FIG. 6.

The resilience for the suspension is provided by a rubber body 120 associated with each stub axle 31. Each rubber body is shown as being of rectangular form in horizontal section with a pyramidal top and having its base vulcanized to a plate 121 removably secured to an axle bracket 122 which forms a longitudinal extension of the outboard end of a corresponding box-form arm 32. For this purpose, each axle bracket 122 is welded to the underside of the outboard end of its box-form arm 32 below its stub axle 31 as best shown in FIGS. 1 and 5, and forms a projection of its arm 32 toward the companion arm 32 at the same side of the vehicle. Each axle bracket 122 can be of any suitable form to provide the necessary strength for transmitting vertical forces to its rubber body 120, the top of which bears against a downwardly facing socket 123 at the end of a walking beam 124. As best shown in FIG. 1 the sockets 123 are provided at opposite ends of this walking beam 124 and are supported by the companion rubber bodies 120 for the two box-form arms 32 at each side of the vehicle frame 25.

Each walking beam 124 can be of any suitable construction but is shown as comprising a pair of channel-shaped arms 125 the inner end of each of which is welded to and projects horizontally from a corresponding half bearing housing 126. These half bearing housings 126, 126 are provided with outwardly projecting vertical flanges 128 which are bolted together by bolts 129 into compressive relation with a rubber bushing 130 which embraces the corresponding end of a cross rod 131 fixed to the frame 25 and projecting outwardly from opposite sides thereof as best shown in FIGS. 3 and 8. Each rubber body 130 can be held against endwise displacement by a pair of rings 132 welded to the cross rod 131 and this cross rod is provided with a pair of V-shaped frame brackets 133 through which the cross shaft extends and is welded and the upper part of which is removably secured, as by bolts 134, to a pair of the cross frame channels 28 as best shown in FIGS. 1 and 8.

OPERATION

The direction of movement of the vehicle is shown by the large arrows above FIGS. 1–3 and in operation the upward movement of one, say, the front wheel 30 and its stub axle 31 effects corresponding upward movement the outboard end of its box-like arm 32 and counterclockwise movement of its fixed hub member or tubular cross shaft 38, as viewed in FIG. 1, such movement being permitted by the rubber bushings 40 and 66 of the bearings 44 and 61.

This angular counterclockwise movement of the tubular hub 38 of the assumed front wheel 30 at the side of the vehicle effects an upward movement of the outboard end of the axle bracket 122, this moving upwardly the rubber body 120 and compressing it against the underside pocket 123 of the front arm 125 of its walking beam 124. The hub of this walking beam is in the form of the two half-bearing housing sections 126 which are rotatably mounted through the companion rubber bushing 130 on the end of the frame cross rod 131 and hence the assumed upward movement of the forward end of the walking beam 124, cushioned by the forward rubber body 120, effects downward movement of the rear end of this walking beam, thereby to compress the rubber body 120 for the rear stub axle 31 downwardly against its bracket 122 at the outboard end of its box-form arm 32. This downward force of the rear end of the walking beam 124 against the rear stub axle 31 serves to equalize the load between the pair of tandem wheels 30 at the side of the vehicle frame 25. It will be noted that substantially all of the resilient resistance to such vertical movement of any of the wheels 30 is provided by the rubber bodies 120 acted upon in direct compression, but that the entire suspension is friction free, the journals being provided by the rubber bushings 40, 66 and 130 which are twisted for this purpose.

The housings for the universal 69, together with the heavy differential gearing (not shown) contained therein, are mounted on the vehicle frame 25 so that this heavy weight is part of the fully sprung mass, rather than being a part of unsprung full axles as is now common practice. These two differentials 69 are driven through the drive shafts 76 and 82, simple flexible couplings 78, 81 and 84 being provided merely to permit a limited amount of frame distortion without interfering with the differential drive. Each differential 69 transmits power from its drive shaft to its two diametrically opposite output shafts 85 journalled in bearings 86 in its diametrically opposite coaxial differential housing sleeves or bosses 68 as best shown in FIG. 4. The pinion 88 at the end of each differential output shaft 85 transmits this movement through the train of gears 98, 100, 101, and 110 arranged in the gear housing 90 which in turn is secured to and hence forms part of the corresponding box-form arm 32. This latter gear 110, through its hub cap 118, drives the splined end 115 of the full floating companion wheel drive shaft 114, as best shown in FIG. 6. Each full floating wheel drive shaft 114 is connected by means (not shown) with the companion dual wheel 30 and hence all four of the dual wheels of the tandem axle, as shown particularly in FIG. 3, are driven to propel the vehicle frame 25 along the road.

It will be particularly noted that each dual wheel 30 is capable of independent vertical movement while at the same time driving power is transmitted thereto via the train of gears 88, 98, 100, 101 and 110 along the box-form arm 32 which connects each dual wheel 30 to the vehicle frame. It will also be noted that vertical forces against any wheel are transmitted through the walking beam 124 to the companion dual wheel 30 at the same side of the vehicle so that the load is at all times shared by these two dual wheels. It will also particularly be noted that this load transfer between the dual wheels 30 at each side of the vehicle is through the rubber bodies 120 which serve, in compression, to provide substantially the entire resilient resistance against movement of the several wheels vertically with reference to the frame 25. It will also be noted that the hub member 38 of each box-form arm 32 is supported by the widely spaced rubber bushings 40 and 66 of the bearings 44 and 61 so that there is no effective corner loading of each of these bearings; the box-form arms 32 are essentially constrained to vertical movement; while at the same time these rubber bushings 40 and 66 by twisting provide friction free journals for the inboard ends of the box-form arms 32 and at the same time provide a limited degree of resilience against horizontal forces.

As in the preceding description, in the following claims "wheel" is intended to include the ground engaging means 30 supporting each stub axle regardless of whether in the form of a single wheel or in the form of the dual tired wheel shown and also the term "rubber" is intended to include natural or synthetic rubber or mixtures of both.

I claim:

1. A vehicle spring suspension adapted to be interposed between a vehicle frame and a pair of tandem rubber tired wheels with rubber tires having road engaging treads and arranged one in advance of the other at at least one side of the frame, and the suspension having a hub structure associated with each wheel, an arm fixed at one end to each hub structure and projecting radially therefrom and toward each other with the free end of each of said arms in facing relationship, such arms being in a common vertical plane extending lengthwise thereof and lengthwise of the line of travel of the vehicle, and a stub axle fixed to each arm remote from its hub structure and forming a journal for the corresponding rubber tired wheel; wherein the improvement comprises outboard bearing means fixed to said frame and pivotally connected to the outboard end of each of said hub structures, inboard bearing means fixed to said frame and pivotally connected to the inboard end of each of said hub structures, a rigid walking beam having its central part pivotally connected to said frame and arranged in the said common vertical plane with its ends overlying and in vertically spaced relation to the corresponding free ends of said arms, and a resilient rubber body interposed between each end of said walking beam and the corresponding arm and compressed therebetween to expand and contract laterally of the force of such compression to provide substantially the entire resilient support for said frame on said tandem rubber tired wheels.

2. A vehicle spring suspension adapted to be interposed between a vehicle frame and a pair of tandem rubber tired wheels with rubber tires having road engaging treads and arranged one in advance of the other at at least one side of the frame, and the suspension having a hub structure associated with each wheel, an arm fixed at one end to each hub structure and projecting radially therefrom and toward each other with the free end of each of said arms in facing relationship, such arms being in a common vertical plane extending lengthwise thereof and lengthwise of the line of travel of the vehicle, and a stub axle fixed to each arm remote from its hub structure and forming a journal for the corresponding rubber tired wheel; wherein the improvement comprises each of said hub structures projecting from opposite sides of said one end of its arm on opposite sides of said common vertical plane and on an axis generally parallel with the axes of said rubber tired wheels, and said common vertical plane lying between the innermost faces of said tandem rubber tires and the center of said vehicle, outboard bearing means pivotally connected to the end of each of said hub structures on the outboard side of said common vertical plane and fixed to said frame in line with at least a part of the treads of said wheels, inboard bearing means pivotally connected to the end of each of said hub structures on the inboard side of said common vertical plane and fixed to said frame, each of said arms being spaced a first distance from its inboard bearing means and being spaced a second distance from its outboard bearing means and said second distance being greater than said first distance thereby to proportion the load against each arm between its said inboard and outboard bearing means in accordance with their spacing from their arm, a rigid walking beam having its central part pivotally connected to said frame and arranged in the said common vertical plane with its ends overlying and in vertically spaced relation to the corresponding free ends of said arms, and a resilient rubber body interposed between each of said walking beam and the corresponding arm and compressed therebetween to expand and contract laterally of the force of such compression to provide substantially the entire resilient support for said frame on said tandem rubber tired wheels.

References Cited

UNITED STATES PATENTS 1,833,053    11/1931    McManus ---------- 180—22 X

A. HARRY LEVY, Primary Examiner